US010317528B2

(12) United States Patent
Curtis et al.

(10) Patent No.: US 10,317,528 B2
(45) Date of Patent: Jun. 11, 2019

(54) CORE INDEPENDENT ULTRASONIC PROXIMITY SENSING PERIPHERAL

(71) Applicant: Microchip Technology Incorporated, Chandler, AZ (US)

(72) Inventors: Keith Curtis, Gilbert, AZ (US); Kristine Angelica Sumague, Batangas (PH); Anthony Stram, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 211 days.

(21) Appl. No.: 15/447,532

(22) Filed: Mar. 2, 2017

(65) Prior Publication Data

US 2017/0254900 A1    Sep. 7, 2017

Related U.S. Application Data

(60) Provisional application No. 62/302,933, filed on Mar. 3, 2016.

(51) Int. Cl.
*G01S 15/00* (2006.01)
*G01S 15/08* (2006.01)
(Continued)

(52) U.S. Cl.
CPC .............. *G01S 15/08* (2013.01); *G01S 7/523* (2013.01); *G01S 15/10* (2013.01); *G01S 15/58* (2013.01)

(58) Field of Classification Search
None
See application file for complete search history.

(56) References Cited

U.S. PATENT DOCUMENTS 3,624,712 A * 11/1971 Weighart ............... G01B 17/02
73/610
3,625,057 A * 12/1971 Kazuhiro ............... G01F 1/667
73/861.27

(Continued)

FOREIGN PATENT DOCUMENTS

WO    WO-2004095056 A1 *  11/2004  ............... G01S 5/18

OTHER PUBLICATIONS

U.S. Non-Final Office Action, U.S. Appl. No. 15/278,984, 15 pages, dated Mar. 22, 2018.

(Continued)

*Primary Examiner* — Isam A Alsomiri
*Assistant Examiner* — Jonathan D Armstrong
(74) *Attorney, Agent, or Firm* — Slayden Grubert Beard PLLC (57) ABSTRACT

A proximity sensing function is implemented using a collection of core independent peripherals (CIPs) in a microcontroller without software overhead to the central processor during operation thereof. A pulse width modulation (PWM) peripheral generates a high frequency drive signal that is on for a short duration to an ultrasonic transmitting transducer. An ultrasonic receiving transducer receives reflected ultrasonic pulses during an integration time window. The received pulses are detected and integrated into a voltage value. The integrated voltage value is compared to a prior voltage value average, and if different, generates a proximity sense signal of an object. Direction, distance and speed of the object may also be determined from the voltage values.

24 Claims, 7 Drawing Sheets

(51) Int. Cl.
  *G01S 15/58* (2006.01)
  *G01S 7/523* (2006.01)
  *G01S 15/10* (2006.01)

(56) References Cited

U.S. PATENT DOCUMENTS

| | | | | |
|---|---|---|---|---|
| 3,665,443 | A | * 5/1972 | Galvin | G01S 13/53 |
| | | | | 342/28 |
| 3,688,565 | A | * 9/1972 | Brech | G01B 17/02 |
| | | | | 73/609 |
| 3,858,438 | A | * 1/1975 | Neumann | G01B 17/02 |
| | | | | 73/615 |
| 3,914,987 | A | 10/1975 | Bickel et al. | 73/609 |
| 3,918,296 | A | * 11/1975 | Kitada | G01S 7/529 |
| | | | | 73/627 |
| 4,075,598 | A | * 2/1978 | Takamizawa | G10K 11/345 |
| | | | | 367/105 |
| 4,075,883 | A | * 2/1978 | Glover | A61B 8/0825 |
| | | | | 378/17 |
| 4,290,310 | A | * 9/1981 | Anderson | G01S 7/52028 |
| | | | | 367/105 |
| 4,439,846 | A | 3/1984 | Rodriguez | 367/99 |
| 4,451,909 | A | 5/1984 | Kodera et al. | 367/99 |
| 4,596,144 | A | * 6/1986 | Panton | G01F 23/2962 |
| | | | | 73/290 V |
| 4,853,904 | A | * 8/1989 | Pesque | A61B 8/06 |
| | | | | 367/89 |
| 5,159,837 | A | 11/1992 | Wada | 73/602 |
| 5,528,217 | A | 6/1996 | Adams | 340/435 |
| 6,314,055 | B1 | 11/2001 | Foxlin et al. | 367/127 |
| 2003/0060163 | A1 | 3/2003 | Filkin et al. | 455/67.11 |
| 2006/0022680 | A1 | 2/2006 | Suginouchi et al. | 324/635 |
| 2009/0093960 | A1 | * 4/2009 | Puhalla | B60W 30/09 |
| | | | | 701/301 |
| 2009/0320602 | A1 | * 12/2009 | Hain | G01N 29/07 |
| | | | | 73/632 |

OTHER PUBLICATIONS

Partial International Search Report and Invitation to Pay Additional Fees, Application No. PCT/US2017/020603, 11 pages, dated May 18, 2017.

Microchip Technology Incorporated, "Section 19. Dual Comparator Module," URL: http://ww1.microchip.com/downloads/en/DeviceDoc/39710b.podf, 12 pages, Jan. 5, 2010.

Microchip Technology Incorporated, "Section 55. Data Signal Modulator (DSM)" URL: http://ww1.microchip.com/downloads/en/DeviceDoc/39744a.pdf, 16 pages, May 11, 2011.

Microchip Technology Incorporated, "Section 10. I/O Ports," URL: http://ww1.microchip.com/downloads/en/DeviceDoc/70193D.pdf, 14 pages, Nov. 29, 2011.

Microchip Technology Incorporated, "Section 64. Capture/Compare/PWM/Timer (MCCP and SCCP)," URL: http://ww1.microchip.com/downloads/en/DeviceDoc/33035a.podf, 64 pages, © 2013.

Curtis, Keith, "AN1536: Ultrasonic Range Detection," Microchip Technology Incorporated, URL: http://ww1.microchip.com/downloads/en/AppNotes/00001536A.podf, 14 pages, Oct. 28, 2013.

Microchip Technology Incorporated, "MPLAB® Code Configurator User's Guide," URL: http://ww1.microchip.com/downloads/en/DeviceDoc/40001725B.pdf, 24 pages, Mar. 25, 2014.

International Search Report and Written Opinion, Application No. PCT/US2015/054301, 13 pages, dated Jan. 5, 2017.

* cited by examiner

CORE INDEPENDENT ULTRASONIC PROXIMITY SENSING PERIPHERAL

RELATED PATENT APPLICATION

This application claims priority to commonly owned U.S. Provisional Patent Application No. 62/302,933; filed Mar. 3, 2016; and U.S. patent application Ser. No. 15/278,984; filed Sep. 28, 2016; both of which are hereby incorporated by reference herein for all purposes.

TECHNICAL FIELD

The present disclosure relates to peripheral devices in a microcontroller or system on a chip, and, in particular, to core independent peripheral devices used for a proximity sensing peripheral.

BACKGROUND

Normally proximity sensing (detection) systems use Passive Infra-Red (PIR) detection to determine when an object is present. Sensitivity of the PIR detector is reduced in high temperature environments. False triggering can occur when IR sources are intermittently covered. PIR sensing systems only report changes in thermal levels (a person sitting quietly may be missed). PIR proximity sensing systems cannot provide information concerning the range of an object.

SUMMARY

Therefore, a need exists for a better proximity sensing method, system and apparatus that is cost effective and may be implemented with a microcontroller.

According to an embodiment, a method for ultrasonic proximity sensing may comprise the steps of: providing a microcontroller having a central processor and memory, and a plurality of core independent peripherals (CIPS) that may comprise an analog-to-digital converter (ADC), a configurable logic cell (CLC), a data signal modulator (DSM), a hardware limit timer (HLT), a fixed voltage reference (FVR), an operational amplifier (OPA), a pulse width modulation generator (PWM), and a timer counter register (TMR); coupling an ultrasonic transmitting transducer to the DSM; and coupling an ultrasonic receiving transducer to a receive OPA; generating signals from the DSM to be transmitted as ultrasonic pulses from the ultrasonic transmitting transducer; receiving reflected ultrasonic pulses with the ultrasonic receiving transducer and generating receive signals to the receive OPA; detecting the received signals with an amplitude modulation detector; integrating the detected received signals to a voltage value; comparing the voltage value to a prior voltage value; and generating a proximity sensed signal when the voltage value may be different than the prior voltage value.

According to a further embodiment of the method, may comprise the step of integrating only the detected signals within an integration time window, wherein the integration time window represents a distance range of an object. According to a further embodiment of the method, the start and stop times of the integration time window may be programmable.

According to a further embodiment of the method, may comprise the steps of: integrating the detected signals within a plurality of different integration time windows to produce a plurality of voltage values representative of each of the different integration time windows; comparing the plurality of voltage values to a plurality of prior voltage values representative of each of the different integration time windows; and generating proximity sensed signals when any one or more of the plurality of voltage values may be different than the respective ones of the plurality of prior voltage values representative of each of the different integration time windows.

According to a further embodiment of the method, may comprise the steps of: determining which of the integration time windows may have a proximity sensed signal; determining in time order which of the proximity sensed signals may be generated and the corresponding integration time windows thereof; and comparing in time a first proximity sensed signal associated with a first integration time window to a second proximity sensed signal associated with a second integration time window, the first integration time window represents a proximity detection of an object at a closer location and the second integration time window represents a proximity detection of the object at a farther away location; wherein if the first proximity sensed signal occurs before the second proximity sensed signal then the object may be moving away, and if the second proximity sensed signal occurs before the first proximity sensed signal then the object may be moving closer.

According to a further embodiment of the method, may comprise the step of determining a speed of the object from the time between the first and second proximity sensed signals. According to a further embodiment of the method, may comprise the step of determining an approximate distance of the object from a proximity sensed signal associated with an integration time window representing the approximate distance of the object. According to a further embodiment of the method, the voltage value may be sampled with the ADC and stored as a digital representation thereof.

According to another embodiment, an ultrasonic proximity sensing device may comprise: a microcontroller that may comprise a central processor and memory, and a plurality of core independent peripherals (CIPs) that may comprise an analog-to-digital converter (ADC), a configurable logic cell (CLC), a data signal modulator (DSM), a hardware limit timer (HLT), a fixed voltage reference (FVR), an operational amplifier (OPA), a programmable ramp generator (PRG), a pulse width modulation generator (PWM), and a timer counter register (TMR); an ultrasonic transmitting transducer coupled to the DSM; and an ultrasonic receiving transducer coupled to a receive OPA; wherein the selected CIPs may be configured to generate signals to be transmitted as ultrasonic pulses from the ultrasonic transmitting transducer, receive signals representing reflected ultrasonic pulses with the ultrasonic receiving transducer, detect the received signals, integrate the detected signals to voltage value, sample the voltage value, store the sampled voltage value as a present voltage value, compare the present voltage value to a prior stored voltage value average, and generate a proximity sensed signal when the present voltage value may be different than the prior stored voltage value average.

According to a further embodiment, the CIPs generate the ultrasonic pulse signals, receive and detect the reflected ultrasonic pulse signals and stores the present voltage value without intervention from the central processor of the microcontroller. According to a further embodiment, logic functions of the CLC may be selected from the group consisting of a flip-flop, a NOR gate, an NAND gate, a XNOR gate, an AND gate, an OR gate, and a XOR gate. According to a further embodiment, the CLC comprises at least two of the logic functions.

According to a further embodiment, an output from the DSM may be coupled to the ultrasonic transmitting transducer; the PWM may be coupled to a first input of the DSM; a first CLC may be configured as a RS flip-flop and may have an output coupled to a second input of the DSM; and a first TMR may have an input coupled to the output of the DSM, and an output coupled to a reset input of the first CLC; wherein a start signal may be coupled to a set input of the first CLC, whereby an ultrasonic pulse may be generated each time the start signal may be asserted and the ultrasonic pulse may have a pulse duration determined by the first TMR.

According to a further embodiment, may comprise: a peak voltage detector coupled to an output of the receive OPA; and a voltage integrator having a first input coupled to an output of the peak voltage detector and a second input coupled to a FVR, wherein when a voltage from the peak voltage detector may be greater than a reference voltage from the FVR the voltage value increases.

According to a further embodiment, the ultrasonic pulses may have a pulse duration of from about 40 to about 200 cycles at 40 kHz. According to a further embodiment, the microcontroller may be in a single integrated circuit package. According to a further embodiment, the ultrasonic transmitting transducer may be at least one ultrasonic transmitting transducer and the ultrasonic receiving transducer may be a plurality of ultrasonic receiving transducers. According to a further embodiment, the at least one ultrasonic transmitting transducer and the plurality of ultrasonic receiving transducers may be arranged in an area for best ultrasonic proximity sensing operation. According to a further embodiment, the microcontroller may be reconfigured into an ultrasonic ranging device after sensing proximity of the at least one object. According to a further embodiment, certain ones of the detected reflected ultrasonic pulses may be integrated when occurring within an integration time window. According to a further embodiment, start and stop times of the integration time window may be programmable.

According to yet another embodiment, a microcontroller may comprise: a central processing unit and memory; and configurable logic cell modules configured to provide first and second RS-flip flops, a first and second timer, a data signal modulator (DSM), an analog-to-digital converter (ADC), a first operational amplifier, a voltage reference module, and a pulse width modulation (PWM) unit; wherein the microcontroller may be configured such that a PWM signal may be fed to the DSM which generates an output PWM signal fed to an external pin and a clock input of the first timer whose output may be fed to a reset input of the first SR-flip flop which receives a start signal at its set input and provides an output signal which may be fed back to the DSM; wherein the start signal may be further fed to a reset input of the second SR-flip-flop whose output triggers the second timer controlling the ADC; and wherein the first operational amplifier may be configured as an integrator receiving an output signal from the ultrasonic receiver and a voltage reference from the voltage reference module.

According to a further embodiment, the output signal of the first SR-flip-flop may be fed to a one-shot timer that may set the second SR flip-flop and may hold and release operation of the integrator. According to a further embodiment, may comprise a second operational amplifier that may be configured to amplify an output signal from the ultrasonic receiver.

BRIEF DESCRIPTION OF THE DRAWINGS

A more complete understanding of the present disclosure may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

Microcontrollers are systems on a chip that generally comprise a central processing unit, memory, a plurality of input/output ports, and a variety of peripheral devices. In particular, a variety of so called core independent peripheral (CIP) devices can be provided such as configurable logic cells, complementary waveform/output generators, numerical controlled oscillators and programmable switch mode controllers. These are unique peripherals available in microcontrollers manufactured by the assignee of the present application. These unique peripherals allow embedded device engineers to simplify their designs and create ever more creative applications and products.

A core independent peripheral (CIP) is a peripheral device in a microcontroller that does not require support from the central processing unit (CPU) of the microcontroller for its operation, while the CPU may be used to initialize and configure such a peripheral device. Thus, once such a CIP device is configured and started, for example by the CPU, it operates on its own and frees processing power of the CPU core for other tasks. For example, a counter, once triggered, starts counting independently from the CPU, a direct memory access controller performs block transfers from/to memory without CPU interaction, etc. Using CIPs decrease parts count, manufacturing costs, and increase reliability and versatility of a product. Many products greatly benefit from such cost savings, increased versatility and reliability. One such product may be used for ultrasonic proximity sensing applications.

In commonly owned U.S. patent application Ser. No. 15/278,984, a ranging function was implemented using a collection of core independent peripherals (CIPs) in a microcontroller. For example, a pulse width modulation (PWM) peripheral may be used to generate a high frequency drive signal, a counter to set the duration of the PWM drive signal (pulse), and a second timer coupled to a comparator to measure the time it takes to receive back a reflection from an object of the ranging signal. As a whole, the ranging peripheral allows the user to set a bit to start the ranging, and receive an interrupt when the ranging measurement has completed. Alternative aspects of the design allow time dependent return pulse detection sensitivity and/or gain adjustments. The aforementioned configurable ultrasonic ranging peripheral does not use up software overhead of a central processor in a microcontroller during operation thereof. The ultrasonic ranging peripheral uses on-chip resources for most of its functions and therefore requires very few external components. It's set and forget nature may be based on CIP based timers, signal generators and configurable logic cells (CLC).

According to various embodiments disclosed herein, the ultrasonic proximity system may use an ultrasonic transmit section. The receive section may use an integrator in place of a comparator. After the ultrasonic transmit pulse, the ultrasonic energy at the receiver is averaged over time to get an acoustic finger printer for the area, e.g., room or enclosure. The result may be converted into a digital representation using an ADC and compared to a previously stored proximity signature average for the area (e.g., room or enclosure), if the present value is different from the previous proximity signature, then a proximity alarm (e.g., interrupt) may be triggered. Because any new object (car, truck, etc.) or body (people, animal, etc.) in the area will change the acoustics thereof, specifically changing reflections and/or absorbing the ultrasonic sound, the resulting integration of acoustic energy in the receiver will change (increased or decreased). Thus, the integration value converted by the ADC will be different from a previously stored integration value, thereby triggering detection of a person or new object in proximity thereto (in the area, room or enclosure).

Such a system may generate 40-60 kHz sound pulses. Timing between the transmission and reception of the strongest ultrasonic energy pulse is timed. Other reflections are either too weak or too late to be measured. People tend to absorb sound rather than reflect sound. Some materials carried by people do reflect sound.

The ultrasonic energy pulse is generated just like in an ultrasonic ranging system, e.g., commonly owned U.S. patent application Ser. No. 15/278,984. The timer and threshold comparator are replaced by an integrator. The integrator may collect all the energy pulse returns to create an ultrasonic reflection finger print for the area. As objects (e.g., people, animals, vehicles, etc.) move in the area they change the reflections by absorbing, or reflecting, various ultrasonic wave fronts. The resulting ultrasonic reflection accumulation can be compared to a stored running average.

According to various embodiments, a microcontroller with configurable logic cell (CLC) modules may be used to implement such an ultrasonic proximity sensing system. For example, a respective microcontroller manufactured by the assignee of the present application comprising core independent peripherals as stated above may be used. A CLC module according to various embodiments may comprise a configurable logic cell that provides, depending on its configuration, as a SR flip-flop, J-K flip-flop, D-latch, various logic gate combinations including AND, OR, XOR, etc. A plurality of such cells, for example four cells, may be included within a microcontroller and the respective configurable cells can be cascaded to provide for one or more desired logic functions. The microcontroller may further comprise timers, a data signal modulator (DSM) module, an operational amplifier, and PWM modules.

Referring now to the drawings, the details of example embodiments are schematically illustrated. Like elements in the drawings will be represented by like numbers, and similar elements will be represented by like numbers with a different lower case letter suffix.

Figure 1:
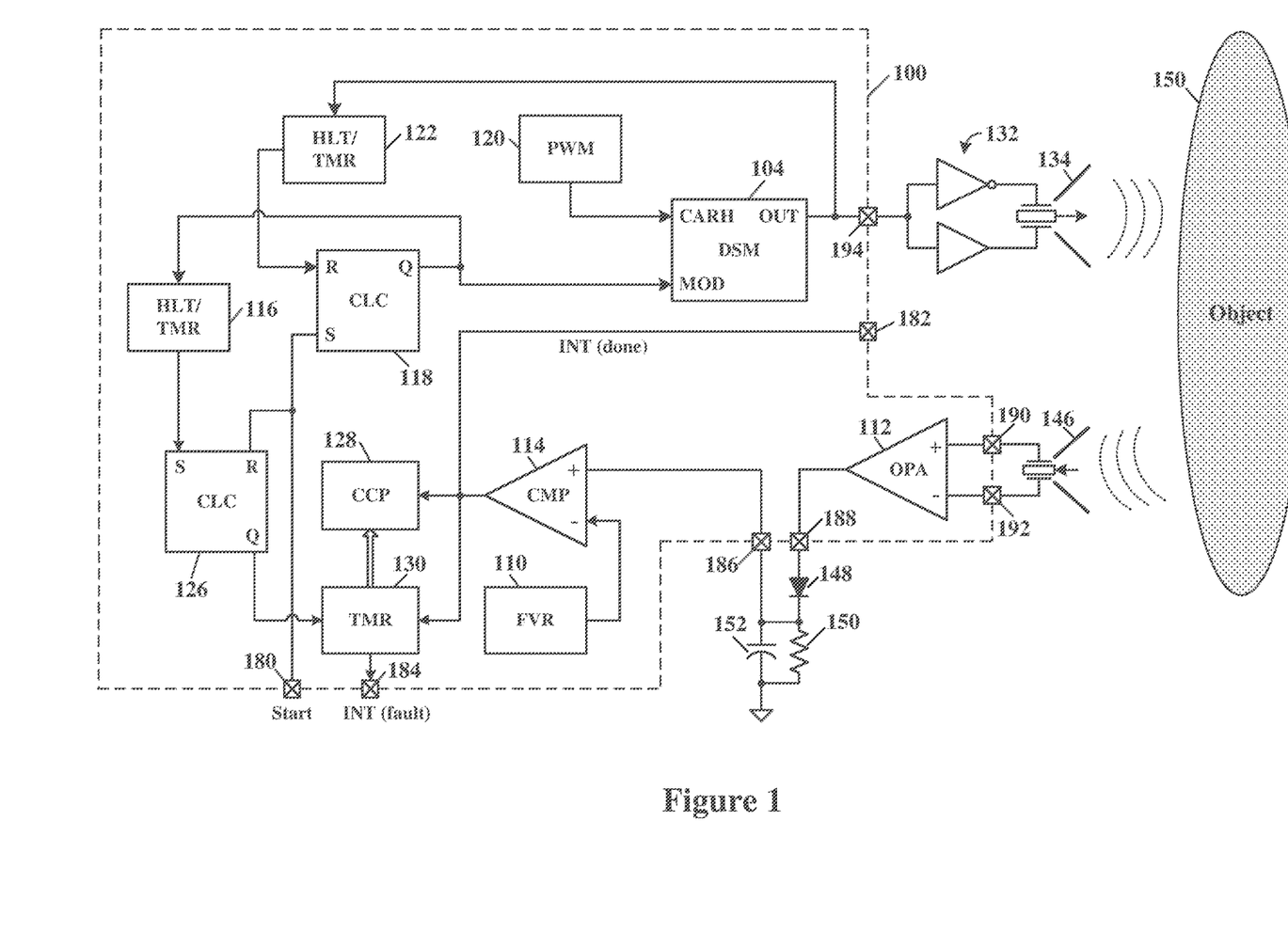
FIG. 1 illustrates a schematic block diagram of an ultrasonic ranging system comprising a microcontroller having a plurality of core independent peripheral (CIP) devices.

Referring to FIG. 1, depicted is a schematic block diagram of an ultrasonic ranging device comprising a microcontroller having a plurality of core independent peripheral (CIP) devices. As more fully described in commonly owned U.S. patent application Ser. No. 15/278,984; a microcontroller 100 may comprise a plurality of core independent peripheral (CIP) devices, for example but are not limited to, the following peripherals: Data Signal Modulator (DSM) 104, Fixed Voltage Reference (FVR) 110, Operational Amplifier (OPA) 112, Comparator (CMP) 114, Hardware Limit Timers (HLT) 116 and 122, Configurable Logic Cells (CLC) 118 and 126, Pulse Width Modulation (PWM) Generator 120, Capture Compare Pulse Width Modulation (CCP) 128, and Timer Counter Register (TMR) 130. The CLCs may comprise, for example but are not limited to, four modules; wherein each module may be configured as flip-flops and/or a variety of logic combinations such as NOR, NAND, XNOR, AND, OR, XOR and other gates, etc. A user may select from a variety of internal and external signals to provide input signals to these modules. The output signals may be either used internally and/or coupled to external nodes (pins) 180-194 of the microcontroller 100. Such logic core independent peripherals (CIPs) allow for simple combinatorial and sequential logic functions to be added without the necessity of additional external devices.

The core independent peripherals (CIPs) and exemplary interconnections thereof for an ultrasonic range detection application are shown in FIG. 1. A start bit at input node 180 triggers a SR-flip flop defined by the CLC 118. This couples a PWM signal from the output of the PWM 120 to the carrier high (CARH) input of the DSM 104. The PWM signal is passed through the DSM 104 and is coupled to an external driver 132 which drives an ultrasonic (acoustic) transmitting transducer 134 to generate a pulse of ultrasonic sound having a frequency of about 40 kHz with a pulse duration determined by the HLT/TMR 122 in combination with the CLC 118 having its Q-output coupled to the modulation (MOD) input of the DSM 104. The pulse duration may be, for example but is not limited to, from about 40 cycles to about 200 cycles of the 40 kHz frequency. The HLT/TMR 122 is activated by a PWM signal on the output of the DSM 104, and when it times out the SR flip-flop of the CLC 118 is reset, ending the PWM pulse from the DSM 104. The high-to-low transition at the output of the SR flip-flop of the CLC 118 triggers the HLT/TMR 116 configured as a one-shot timer. This one-shot timer (HLT/TMR 116) provides the necessary dead time between ultrasonic signal transmit and receive, so residual oscillations from the ultrasonic transmitting transducer 134 element do not generate a false signal during the receiver operation. When the one-shot timer (HLT/TMR 116) times out, the second SR flip-flop CLC 126 is set thereby enabling the timer gate TMR 130 to start counting the time it takes to detected a reflected return ultrasonic signal. When a reflected return ultrasonic signal is received by an ultrasonic receiving transducer 146 and amplified by the OPA 112, a peak detector comprising diode 148, resistor 150 and capacitor 152; may be coupled to an input of the CMP 114 that will cause the output of the CMP 114 to initiate a capture event to store the time count from the TMR 130 in the CCP 128. This action also generates an interrupt 182 that notifies the program running in the central processor (not shown) of the microcontroller 100 of a receipt and capture of the time required for the round trip of the ultrasonic pulse. If no DC signal of sufficient amplitude is received at the input of the CMP 114 then a time out of the TMR 130 will trigger a fault interrupt 184 (no ultrasonic return signal received).

Thus, the entire system except for the actual ultrasonic transducers 134 and 146, and some external components may be provided by a microcontroller comprising the above-mentioned CIP peripherals. For example, as shown in FIG. 1, only the diode 148, resistor 150, capacitor 152, the ultrasonic transmitter driver 132, and transmit and receive transducers 134 and 146, respectively, are required as external components. The remaining components may be provided by CIP peripherals of the microcontroller 100.

Figure 2:
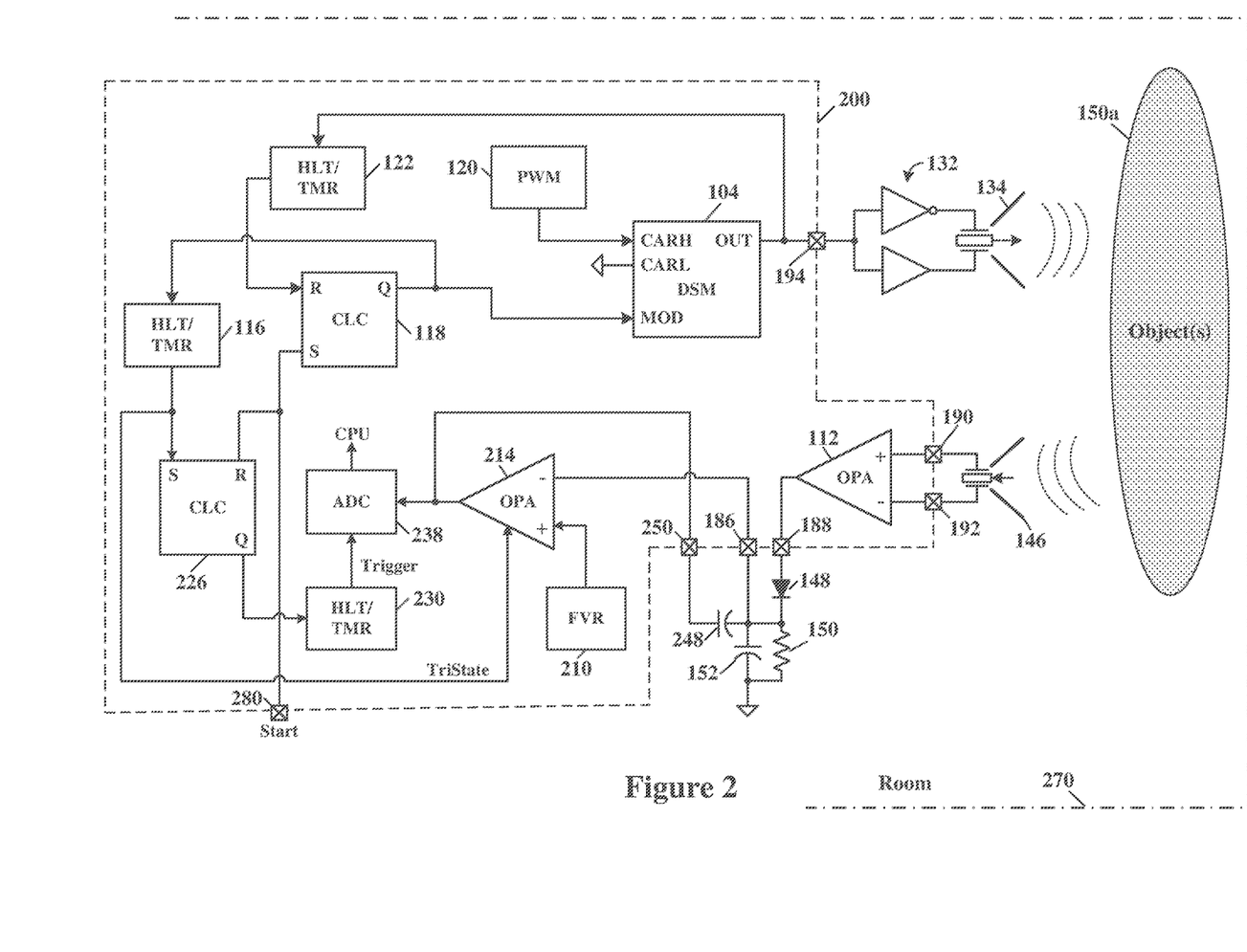
FIG. 2 illustrates a schematic block diagram of an ultrasonic proximity sensing system comprising a microcontroller having a plurality of core independent peripheral (CIP) devices, according to a specific example embodiment of this disclosure.

Referring to FIG. 2, depicted is a schematic block diagram of an ultrasonic proximity sensing system comprising a microcontroller having a plurality of core independent peripheral (CIP) devices, according to a specific example embodiment of this disclosure. A microcontroller 200 may comprise a plurality of core independent peripheral (CIP) devices, for example but are not limited to, the following peripherals: Data Signal Modulator (DSM) 104, Fixed Voltage Reference (FVR) 210, Operational Amplifiers (OPA) 112 and 214, analog-to-digital converter (ADC) 238, Hardware Limit Timers (HLT) 116 and 122, Configurable Logic Cells (CLC) 118 and 226, Pulse Width Modulation (PWM) Generator 120, and Timer Counter Register (TMR) 230. The CLCs may comprise, for example but are not limited to, four modules; wherein each module may be configured as flip-flops and/or a variety of logic combinations such as NOR, NAND, XNOR, AND, OR, XOR and other gates, etc. A user may select from a variety of internal and external signals to provide input signals to these modules. The output signals may be either used internally and/or coupled to external nodes (pins) 180-194 of the microcontroller 200. Such logic core independent peripherals (CIPs) allow for simple combinatorial and sequential logic functions to be added without the necessity of additional external devices.

The core independent peripherals (CIPs) and exemplary interconnections thereof for an ultrasonic proximity sensing application are shown in FIG. 2. A start bit at input node 280 triggers the SR-flip flop in the CLC module 118. This couples a PWM signal from the output of the PWM 120 to the carrier high (CARH) input of the DSM 104. The PWM signal is passed through the DSM 104 and is coupled to an external driver 132 which drives an ultrasonic (acoustic) transmitting transducer 134 to generate a pulse of an ultrasonic sound having a frequency of about 40 kHz with a pulse duration determined by the HLT/TMR 122 in combination with the CLC 118 having its Q-output coupled to the modulation (MOD) input of the DSM 104. The HLT/TMR 122 is activated by a PWM signal on the output of the DSM 104, and when it times out the SR flip-flop of the CLC 118 is reset, ending the PWM pulse from the DSM 104. The high-to-low transition at the output of the SR flip-flop of the CLC 118 triggers the HLT/TMR 116 configured as a one-shot timer. This one-shot timer (HLT/TMR 116) provides the necessary dead time between ultrasonic signal transmit and receive, so residual oscillations from the ultrasonic transmitting transducer 134 element do not generate a false signal during the receiver operation. When the one-shot timer (HLT/TMR 116) times out, the second SR flip-flop CLC 226 is set thereby enabling the timer gate TMR 230 to start counting time for an "integration window" to take place while the reflected return ultrasonic signal(s) are received and integrated. When the reflected return ultrasonic signals are received by an ultrasonic receiving transducer 146 and amplified by the OPA 112, an amplitude modulation (AM) diode detector, comprising diode 148, resistor 150 and capacitor 152; will provide received ultrasonic acoustic energy to a voltage integrator, comprising OPA 214 and capacitor 248, for accumulation thereof.

When the integrator input is pulled low, the output of the OPA 214 goes high to compensate for the input offset. The longer the output stays high, the larger the charge in the capacitor 248 and the higher the output voltage. In this way, a negative input produces a positive integration with respect to time. The same happens when the input is above the non-inverting input of the OPA 214, the integration is negative though. Tri-stating the output of the OPA 214 stops the integration process. So, when the pulse is generated, the OPA 214 is tri-stated and nothing is integrated. When the output is enabled the integration begins and runs until the output of the OPA 214 is tri-stated again. The result is an accumulation of the energy from the start time to the end time. By specifying the start and stop times of the integration, you can literally specify the range from the unit over which you integrate. So basically, one can determine the finger print for a shell, for example, from 3' to 5' from the transducer. By measuring the finger print for multiple shells; e.g., 1-2, 2-3, 3-4, 4-5, and 5-6 feet, one can determine whether something is moving toward or away from the sensor 146 by just seeing changes move from further out to closer in, and vice versa. One can even estimate the speed of the object moving by observing time of change between shells. Approximate distance of the object may be determined from which shell (integration time window) has an object detection therein.

When the final hardware limit timer (HLT) 230 times out, it will trigger a conversion by the ADC 238 which will convert the accumulated received ultrasonic energy into a digital value. This digital value may be coupled to a digital processor and memory 380 (FIG. 3) where it may be stored and compared to a running average, if the absolute difference (+/−) is greater than a preset integration threshold, then a proximity event is detected, if not, then the value may be averaged into the running average and the proximity sensing process repeated. Thus, the entire system except for the actual ultrasonic transducers 134 and 146, and some external components may be provided by a microcontroller 200 comprising the above-mentioned CIP peripherals. For example, as shown in FIG. 2, only the diode 148, resistor 150, capacitors 152 and 248, the ultrasonic transmitter driver 132, and transmit and receive transducers 134 and 146, respectively, are required as external components. The remaining components may be provided by CIP peripherals of the microcontroller 200.

The proximity sensing system shown in FIG. 2 is immune to thermal changes in the environment. If the acoustic finger print for the area (room or enclosure) 270 changes over time, the average will still allow the capture of fast motion. The gated integrator allows the monitoring of different bands of proximity. The complete system can be implemented with CIPs in a microcontroller with minimal software overhead.

It is contemplated and within the scope of this disclosure that the ultrasonic proximity sensing peripheral, as shown in FIG. 2, may be adapted to be reconfigured into an ultrasonic ranging peripheral, as shown in FIG. 1, since most of the modules and functions are substantially the same between the two peripherals. Provision could be made in the microcontroller for the comparator (CMP) 114, CCP 128, OPA 214 and ADC 238 to be switchably selectable as required. Wherein after the proximity sensing peripheral detects an object the microcontroller could switch to the ultrasonic ranging peripheral to obtain more detailed location information of the object detected during the proximity sensing operation.

Figure 3:
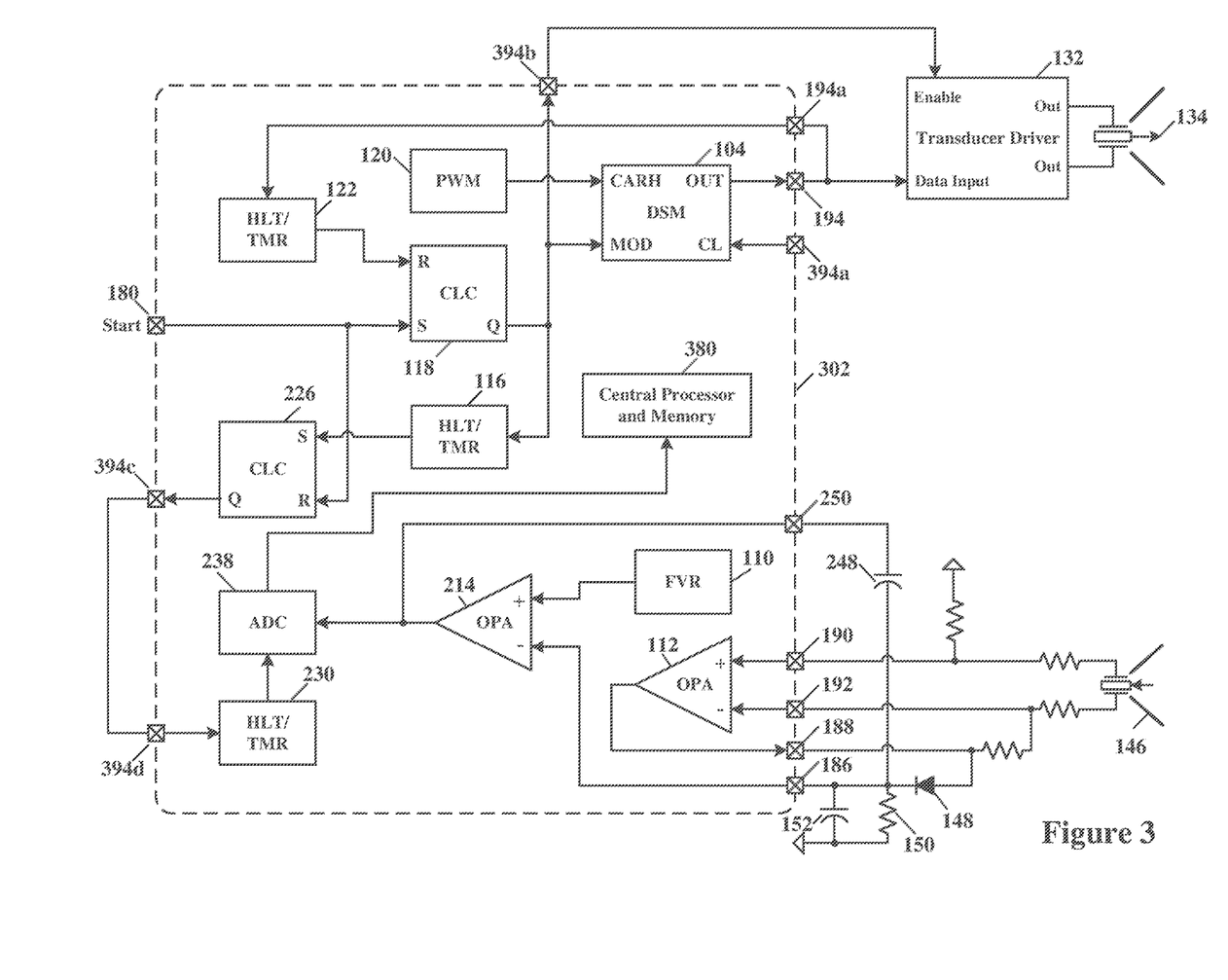
FIG. 3 illustrates a schematic block diagram of a microcontroller integrated circuit package comprising the ultrasonic proximity sensing device shown in FIG. 2.

Referring to FIG. 3, depicted is a schematic block diagram of a microcontroller integrated circuit package comprising the ultrasonic proximity sensing device shown in FIG. 2. The proximity sensing system shown in FIG. 2 may be provided with a microcontroller 302 comprising an integrated circuit package and the aforementioned CIPs and further comprises a central processor and memory 380. Once the CIPs have been configured (using configuration registers not shown) they become independent in operation from the central processor and memory 380, and only interact therewith upon a Start input and interrupt outputs. Various external connection nodes (pins) 180-194, 394 may be provided on the microcontroller 302 integrated circuit package.

Figure 4:
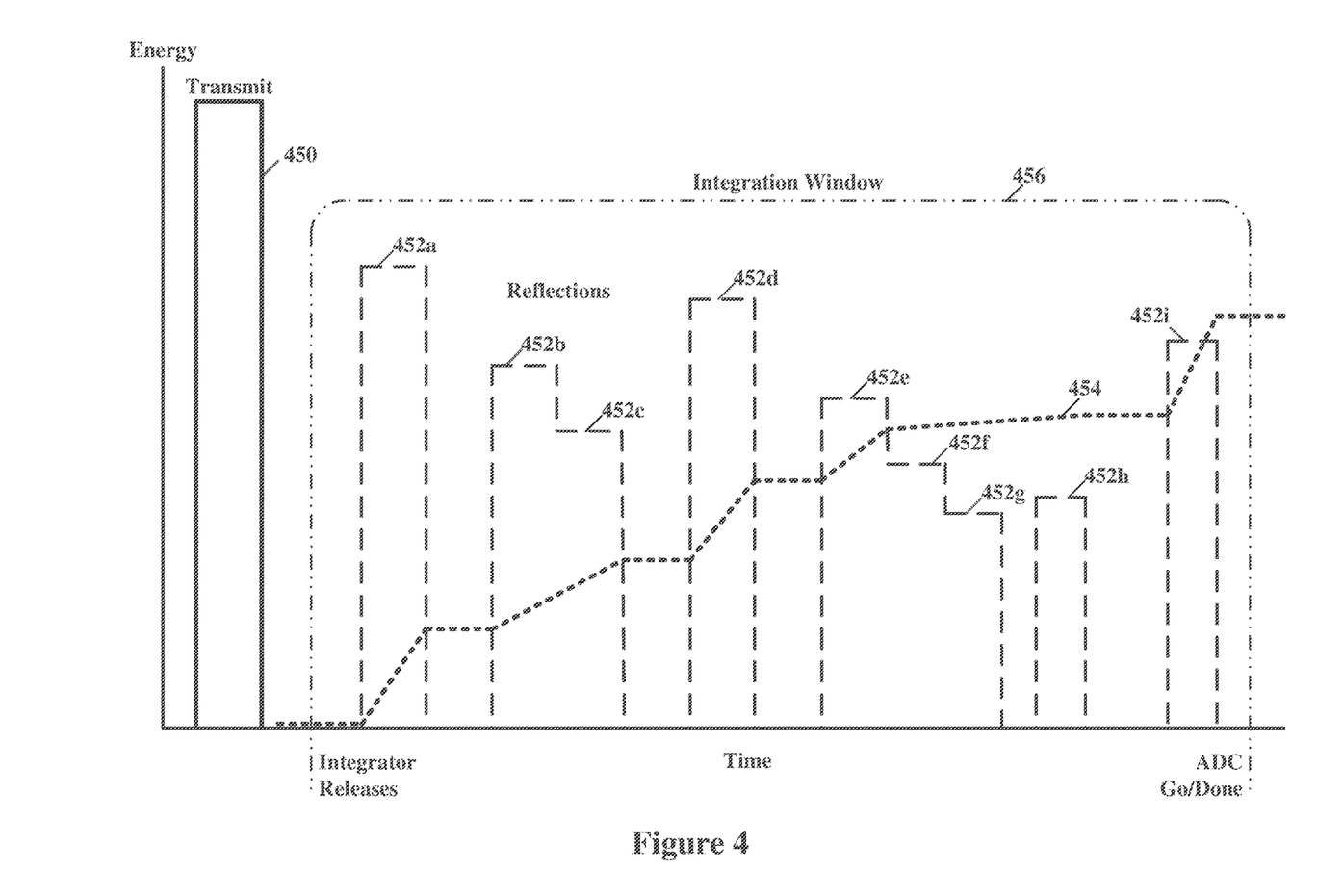
FIG. 4 illustrates a schematic graph of an integration process of the received ultrasonic energy, according to the teachings of this disclosure.

Referring to FIG. 4, depicted is a schematic graph of an integration process of the received ultrasonic energy, according to the teachings of this disclosure. Detected voltages from the AM detector (diode 148 and capacitor 152) are integrated in the integrator (OPA 214 and capacitor 248) during an integration window 456 starting when the integrator is released (unclamped) to begin accumulating voltage charge until the ADC 238 takes a sample of this accumulated voltage. A digital representation from the ADC 238 of the voltage sample may be stored in the central processor memory 380 and compared with the digital representations of previous voltage samples.

Figure 5:
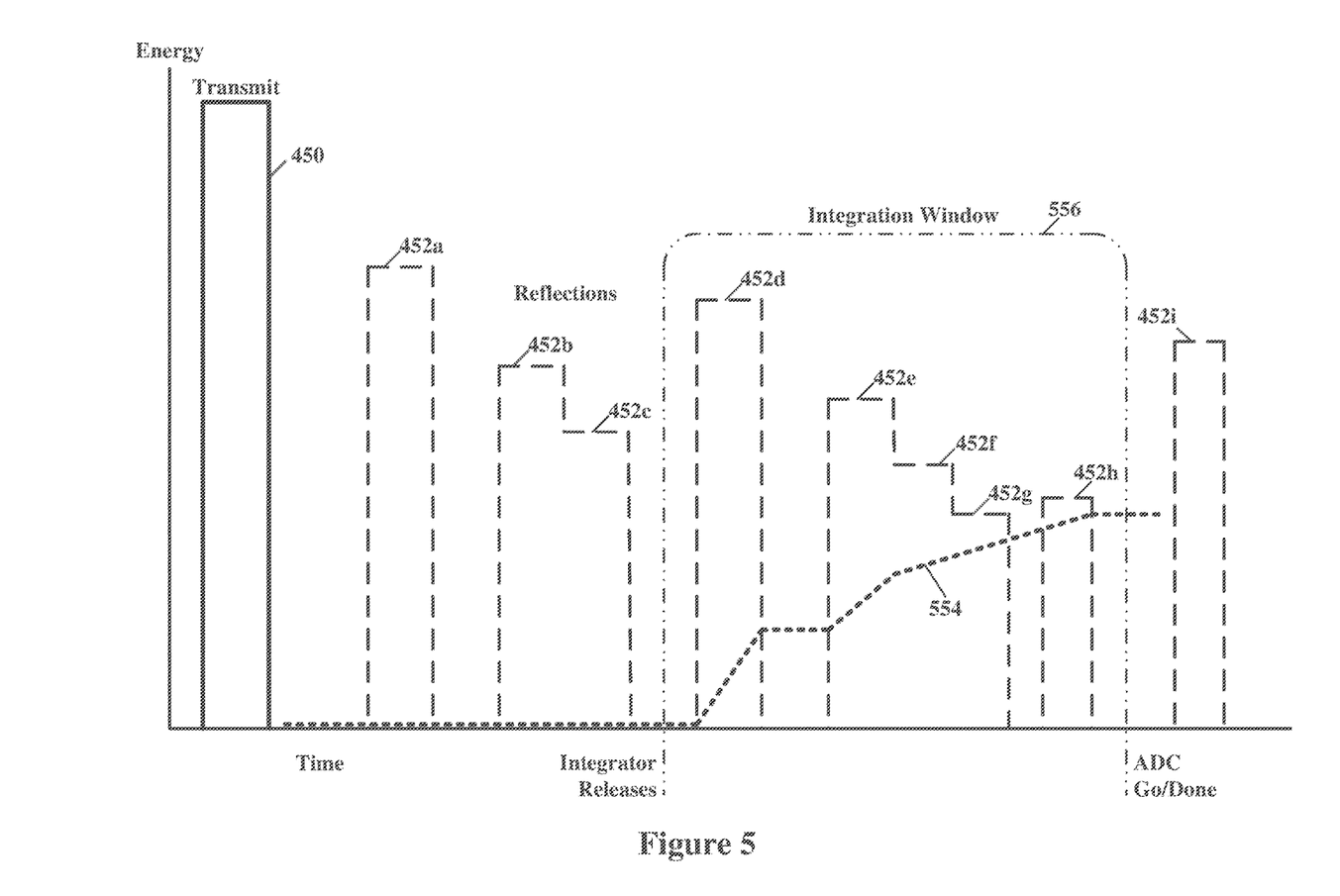
FIG. 5 illustrates a schematic graph of an integration process of the received ultrasonic energy using a delayed and shortened integration time window, according to the teachings of this disclosure.

Referring to FIG. 5, depicted is a schematic graph of an integration process of the received ultrasonic energy using a delayed and shortened integration time window, according to the teachings of this disclosure. The primary ultrasonic energy reflection 452a may dominate the integrator input so a delayed and/or reduced integration window time may be used instead of integrating over the entire time of ultrasonic reflections (FIG. 4). The reduced integration window 556 only integrates ultrasonic reflections 452d-452h, and will ignore ultrasonic reflections 452a-452 and 452i. This may prevent overloading of the integrator. A delay timer may be used to hold the integrator in reset, blanking out this strong reflection. A second timer may trigger the ADC to set the end of the integration. Averages for different windows may be retained to get a finger print for different bands of reflections.

If the returned energy is integrated over the entire range, you must have sufficient storage to hold the full charge. By integrating over a smaller range, one can increase the gain and the resulting resolution of the ADC conversion. One can also look for disturbances moving from one window to another denoting something moving toward or away from the sensor. As mentioned above, one can also estimate the speed of the motion. One could also detect and potentially identify multiple objects moving around the sensor. Think of it as concentric circles of trip wires, as someone (or object) moves toward the center, the trips wires will fire sequentially from outside to inside.

Figure 6:
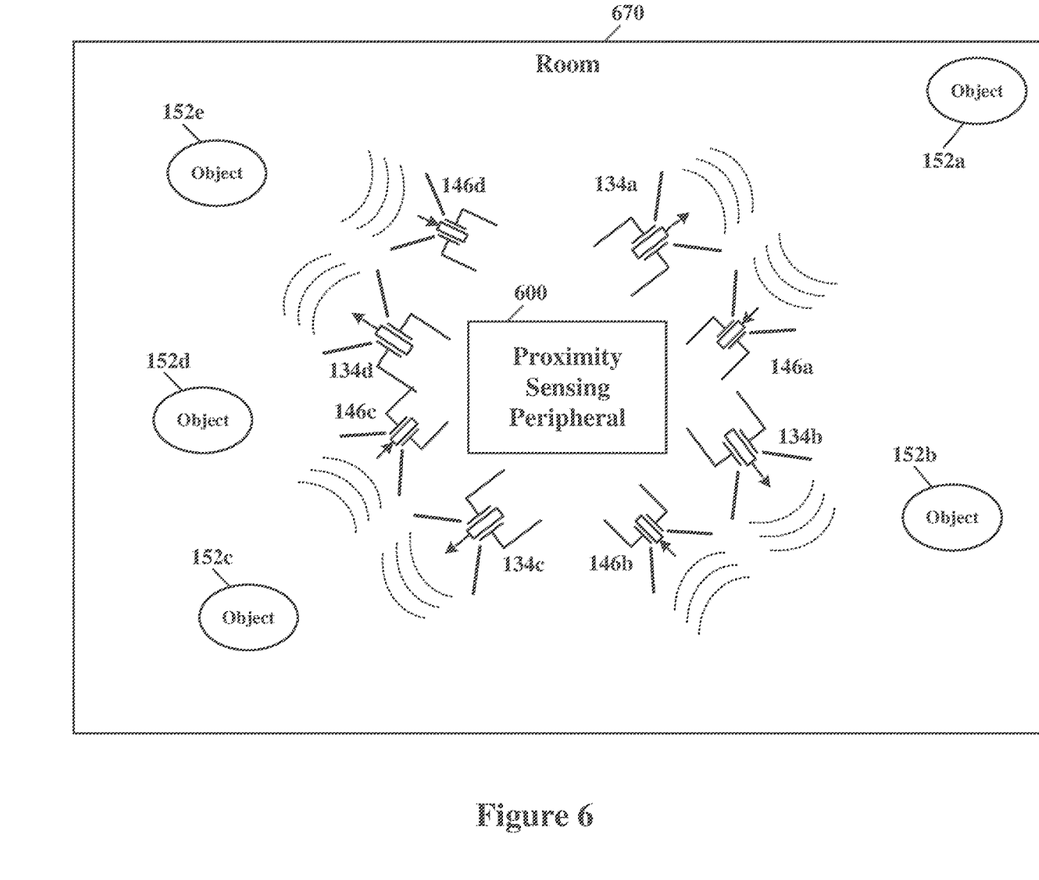
FIG. 6 illustrates a schematic plan view of a proximity sensing peripheral coupled with a plurality of ultrasonic transducers arranged in an area, according to another specific example embodiment of this disclosure.

Referring to FIG. 6, depicted is a schematic plan view of a proximity sensing peripheral coupled with a plurality of ultrasonic transducers arranged in an area, according to another specific example embodiment of this disclosure. A proximity sensing peripheral 600 may be coupled to at least one transmitting transducer 134 and a plurality of receiving transducers 146. The plurality of receiving transducers 146 may be positioned for best reflected ultrasonic pulse reception coverage in the area 670 (room or enclosure), and the at least one transmitting transducer 134 positioned for best ultrasonic pulse transmission coverage. For example, the at least one transmitting transducer 134 may be centrally located and oriented to send ultrasonic pulses to the ceiling of the area 670 for reflection therefrom and reception by the plurality of receiving transducers 146. An arrangement of multiple transmitting and receiver transducers 134 and 146 may be advantageous for odd shaped rooms so as to eliminate dead spots therein. Operations of the at least one transmitting transducer 134 and the plurality of receiving transducers 146 may be time division multiplexed with the proximity sensing peripheral 200 and ultrasonic reception averages calculated and stored for each different area (zones) of the room 670.

Figure 7:
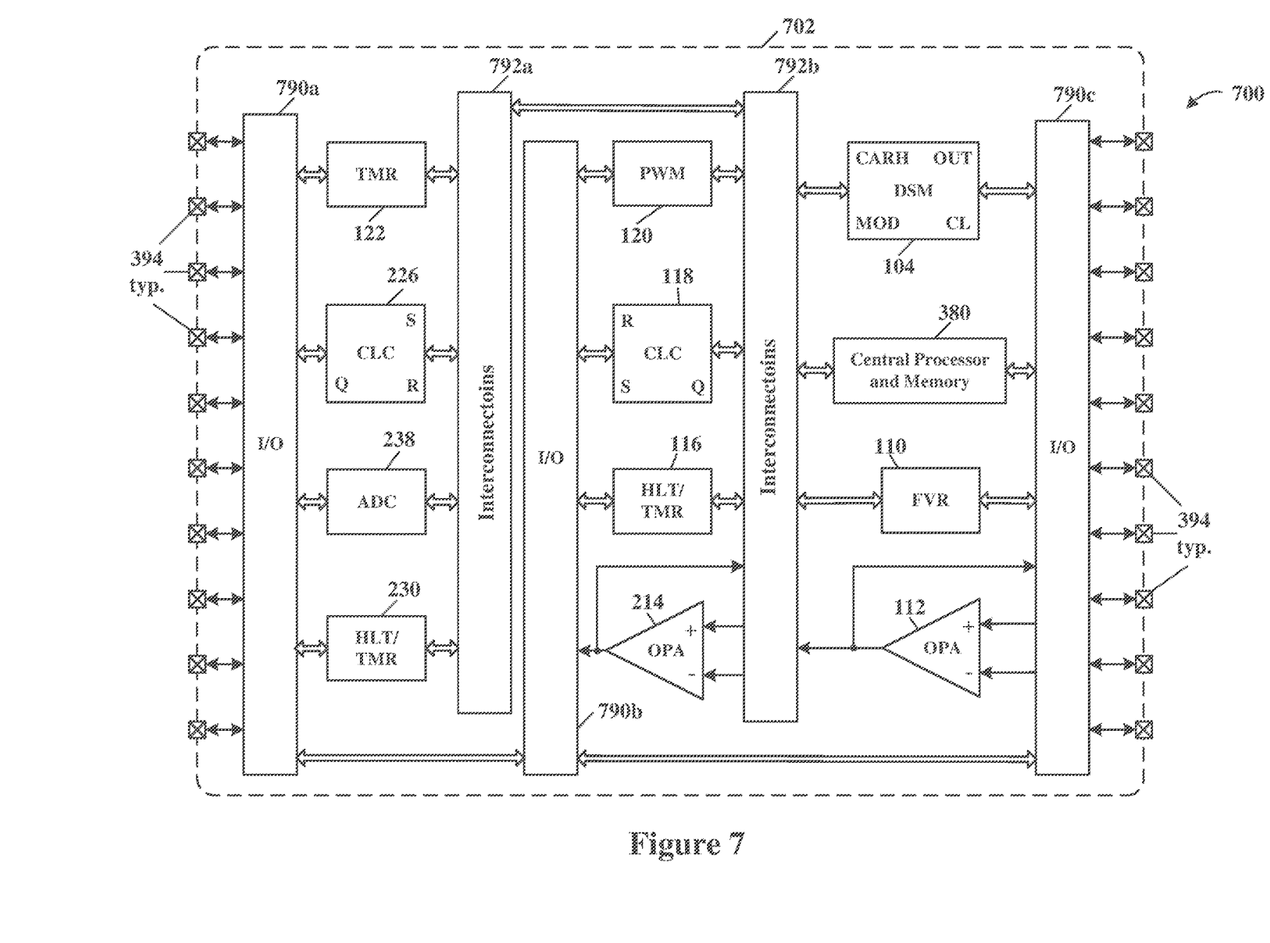
FIG. 7 illustrates a schematic block diagram of a microcontroller integrated circuit package comprising core independent peripherals (CIPs) and programmable interconnections thereto, according to the teachings of this disclosure.

Referring to FIG. 7, depicted is a schematic block diagram of a microcontroller in an integrated circuit package, comprising core independent peripherals (CIPs) and programmable interconnections thereto, according to the teachings of this disclosure. A microcontroller, generally represented by the numeral 700, may comprise an integrated circuit package 702 having external connection nodes (pins) 394 that may be used for power, ground, input, output and input/output signals. The CIPs, as described more fully hereinabove, may have their input and output signals internally connected to other CIPs and/or to the external connection nodes 790. I/O (input/output) multiplexers (or switching matrixes) 790 may be programmed to interconnect desired nodes 794 to respective signal inputs and output of the CIPs. Interconnection multiplexers 792 may be programmed to interconnect signal inputs and outputs between CIPs.

The external nodes (pins) 180-194, 250 and 394 of a microcontroller integrated circuit package, e.g., 202, 302; may be used for external connections of additional components. MPLAB® Code Configurator (MCC) may be utilized to easily configure functionality of the internal (to the microcontroller integrated circuit) CIPs used in this ultrasonic ranging detection application. The MCC may further be used to configure (program) internal interconnections (e.g., interconnection multiplexers 792) between the CIPs and/or external integrated circuit package connections (e.g., I/O multiplexers 790) to the CIPs. The MCC is a user-friendly plug-in tool for MPLAB®X IDE which generates drivers for controlling and driving peripherals of PIC® microcontrollers, based on the settings and selections made in its Graphical User Interface (GUI). Refer to the "MPLAB® Code Configurator User's Guide" (DS40001725) for further information on how to install and set up the MCC in MPLAB® X IDE, available at www.microchip.com all of which are incorporated by reference herein for all purposes. MPLAB® and PIC® are registered trademarks of Microchip Technology Inc., the assignee of the present patent application.

The various CIPs used in the specific example embodiments shown herein are further described as follows: The DSM peripheral is described in Microchip data sheet "Data signal Modulator", DS39744. The CLC peripheral is described in Microchip data sheet "Configurable Logic Cell", DS33949. The CCP (capture compare, PWM and Timer) peripheral is described in Microchip data sheet "Capture/Compare/PWM/Timer," DS33035. The comparator peripheral is described in Microchip data sheet "Dual Comparator Module", DS39710. The I/O ports are for example described in Microchip data sheet "I/O Ports", DS70193. Other peripherals such as digital-to-analog converters (DACs), reference voltage generators, programmable gain amplifier (PGA), and a programmable ramp generator (PRG) may be used. All the aforementioned data sheets are available from Microchip Technology Inc., the assignee of the present patent application, and all are hereby incorporated by reference herein for all purposes.

Microchip Application Note AN1536, latest version DS00001536B, available at www.microchip.com, has further detailed information on using the core independent peripherals (CIPs) in a microcontroller for ranging applications, theory and application of ranging devices, and design and programming thereof, and is hereby incorporated by reference herein for all purposes.

The invention claimed is:

1. A method for ultrasonic proximity sensing, comprising the steps of:
   providing a microcontroller having a central processor and memory, and a plurality of core independent peripherals (CIPs) comprising;
   an analog-to-digital converter (ADC),
   a configurable logic cell (CLC),
   a data signal modulator (DSM),
   a hardware limit timer (HLT),
   a fixed voltage reference (FVR),
   an operational amplifier (OPA),
   a pulse width modulation generator (PWM), and
   a timer counter register (TMR);
   coupling an ultrasonic transmitting transducer to the DSM; and
   coupling an ultrasonic receiving transducer to a receive OPA;
   generating signals from the DSM to be transmitted as ultrasonic pulses from the ultrasonic transmitting transducer;
   receiving reflected ultrasonic pulses with the ultrasonic receiving transducer and generating receive signals to the receive OPA;
   detecting the received signals with an amplitude modulation detector;
   integrating the detected received signals to a voltage value;
   comparing the voltage value to a prior voltage value; and
   generating a proximity sensed signal when the voltage value is different than the prior voltage value.

2. The method according to claim 1, further comprising the step of integrating only the detected signals within an integration time window, wherein the integration time window represents a distance range of an object.

3. The method according to 2, wherein the start and stop times of the integration time window are programmable.

4. The method according to claim 1, further comprising the steps of:
   integrating the detected signals within a plurality of different integration time windows to produce a plurality of voltage values representative of each of the different integration time windows;
   comparing the plurality of voltage values to a plurality of prior voltage values representative of each of the different integration time windows; and
   generating proximity sensed signals when any one or more of the plurality of voltage values is different than the respective ones of the plurality of prior voltage values representative of each of the different integration time windows.

5. The method according to claim 4, further comprising the steps of:
   determining which of the integration time windows have a proximity sensed signal;
   determining in time order which of the proximity sensed signals are generated and the corresponding integration time windows thereof; and
   comparing in time a first proximity sensed signal associated with a first integration time window to a second proximity sensed signal associated with a second integration time window, the first integration time window represents a proximity detection of an object at a closer location and the second integration time window represents a proximity detection of the object at a farther away location;
   wherein
   if the first proximity sensed signal occurs before the second proximity sensed signal then the object is moving away, and
   if the second proximity sensed signal occurs before the first proximity sensed signal then the object is moving closer.

6. The method according to claim 5, further comprising the step of determining a speed of the object from the time between the first and second proximity sensed signals.

7. The method according to claim 5, further comprising the step of determining an approximate distance of the object from a proximity sensed signal associated with an integration time window representing the approximate distance of the object.

8. The method according to claim 1, wherein the voltage value is sampled with the ADC and stored as a digital representation thereof.

9. An ultrasonic proximity sensing device, comprising:
   a microcontroller comprising
      a central processor and memory, and
      a plurality of core independent peripherals (CIPs) comprising
         an analog-to-digital converter (ADC),
         a configurable logic cell (CLC),
         a data signal modulator (DSM),
         a hardware limit timer (HLT),
         a fixed voltage reference (FVR),
         an operational amplifier (OPA),
         a programmable ramp generator (PRG),
         a pulse width modulation generator (PWM), and
         a timer counter register (TMR);
   an ultrasonic transmitting transducer coupled to the DSM; and
   an ultrasonic receiving transducer coupled to a receive OPA;
   wherein the selected CIPs are configured to
      generate signals to be transmitted as ultrasonic pulses from the ultrasonic transmitting transducer,
      receive signals representing reflected ultrasonic pulses with the ultrasonic receiving transducer,
      detect the received signals,
      integrate the detected signals to voltage value,
      sample the voltage value,
      store the sampled voltage value as a present voltage value, compare the present voltage value to a prior stored voltage value average, and generate a proximity sensed signal when the present voltage value is different than the prior stored voltage value average.

10. The ultrasonic proximity sensing device according to claim 9, wherein the CIPs generate the ultrasonic pulse signals, receive and detect the reflected ultrasonic pulse signals and stores the present voltage value without intervention from the central processor of the microcontroller.

11. The ultrasonic proximity sensing device according to claim 9, wherein logic functions of the CLC are selected from the group consisting of a flip-flop, a NOR gate, an NAND gate, a XNOR gate, an AND gate, an OR gate, and a XOR gate.

12. The ultrasonic proximity sensing device according to claim 11, wherein the CLC comprises at least two of the logic functions.

13. The ultrasonic proximity sensing device according to claim 12, wherein:
an output from the DSM is coupled to the ultrasonic transmitting transducer;
the PWM is coupled to a first input of the DSM;
a first CLC is configured as a RS flip-flop and has an output coupled to a second input of the DSM; and
a first TMR has an input coupled to the output of the DSM, and an output coupled to a reset input of the first CLC;
wherein a start signal is coupled to a set input of the first CLC, whereby an ultrasonic pulse is generated each time the start signal is asserted and the ultrasonic pulse has a pulse duration determined by the first TMR.

14. The ultrasonic proximity sensing device according to claim 13, further comprising:
a peak voltage detector coupled to an output of the receive OPA; and
a voltage integrator having a first input coupled to an output of the peak voltage detector and a second input coupled to a FVR, wherein when a voltage from the peak voltage detector is greater than a reference voltage from the FVR the voltage value increases.

15. The ultrasonic proximity sensing device according to claim 9, wherein the ultrasonic pulses have a pulse duration of from about 40 to about 200 cycles at 40 kHz.

16. The ultrasonic proximity sensing device according to claim 9, wherein the microcontroller is in a single integrated circuit package.

17. The ultrasonic proximity sensing device according to claim 9, wherein the ultrasonic transmitting transducer is at least one ultrasonic transmitting transducer and the ultrasonic receiving transducer is a plurality of ultrasonic receiving transducers.

18. The ultrasonic proximity sensing device according to claim 17, wherein the at least one ultrasonic transmitting transducer and the plurality of ultrasonic receiving transducers are arranged in an area for best ultrasonic proximity sensing operation.

19. The ultrasonic proximity sensing device according to claim 9, wherein the microcontroller is reconfigured into an ultrasonic ranging device after sensing proximity of the at least one object.

20. The ultrasonic proximity sensing device according to claim 9, wherein certain ones of the detected reflected ultrasonic pulses are integrated when occurring within an integration time window.

21. The ultrasonic proximity sensing device according to claim 20, wherein start and stop times of the integration time window are programmable.

22. A microcontroller, comprising
a central processing unit and memory; and
configurable logic cell modules configured to provide
first and second RS-flip flops,
a first and second timer,
a data signal modulator (DSM),
an analog-to-digital converter (ADC),
a first operational amplifier,
a voltage reference module, and
a pulse width modulation (PWM) unit;
wherein the microcontroller is configured such that a PWM signal is fed to the DSM which generates an output PWM signal fed to an external pin and a clock input of the first timer whose output is fed to a reset input of the first SR-flip flop which receives a start signal at its set input and provides an output signal which is fed back to the DSM;
wherein the start signal is further fed to a reset input of the second SR-flip-flop whose output triggers the second timer controlling the ADC; and
wherein the first operational amplifier is configured as an integrator receiving an output signal from the ultrasonic receiver and a voltage reference from the voltage reference module.

23. The microcontroller according to claim 22, wherein the output signal of the first SR-flip-flop is fed to a one-shot timer which sets the second SR flip-flop and holds and releases operation of the integrator.

24. The microcontroller according to claim 9, further comprising a second operational amplifier configured to amplify an output signal from the ultrasonic receiver.

* * * * *